United States Patent
Kawano et al.

(10) Patent No.: US 8,674,632 B2
(45) Date of Patent: Mar. 18, 2014

(54) MOTOR CONTROL DEVICE WITH A CORRECTING UNIT DETERMINING A CORRECTED ROTATION ANGLE AFTER A PREDETERMINED TIME FROM A DETECTION TIME, CONTROL PROGRAM THEREFOR, AND METHOD FOR THE CONTROL

(75) Inventors: Youji Kawano, Yokohama (JP); Masato Uwatoko, Yokohama (JP); Motoki Shimozono, Yokohama (JP); Kazuhiro Konomoto, Chuo (JP); Hiroshi Haibara, Yokohama (JP); Koji Mizumoto, Yokohama (JP)

(73) Assignee: Spansion LLP, Sunnyvale, CA (US)

(*) Notice: Subject to any disclaimer, the term of this patent is extended or adjusted under 35 U.S.C. 154(b) by 31 days.

(21) Appl. No.: 13/371,533

(22) Filed: Feb. 13, 2012

(65) Prior Publication Data
US 2012/0217910 A1 Aug. 30, 2012

(30) Foreign Application Priority Data
Feb. 28, 2011 (JP) .................................. 2011-042267

(51) Int. Cl.
*H02P 21/00* (2006.01)
(52) U.S. Cl.
USPC . 318/400.02; 318/605; 318/661; 324/207.25; 341/112; 341/115

(58) Field of Classification Search
USPC .............. 341/112, 115; 324/207.25; 318/605, 318/661, 400.02
See application file for complete search history.

(56) References Cited

U.S. PATENT DOCUMENTS

| | | | |
|---|---|---|---|
| 2008/0272731 A1* | 11/2008 | Schulz et al. ................. | 318/807 |
| 2010/0176975 A1* | 7/2010 | Nakazato et al. ............. | 341/118 |
| 2011/0022271 A1 | 1/2011 | Ueda et al. | |

FOREIGN PATENT DOCUMENTS

| | | |
|---|---|---|
| JP | 2004-336913 | 11/2004 |
| JP | 2008-273478 | 11/2008 |
| JP | 2009-247181 | 10/2009 |

\* cited by examiner

*Primary Examiner* — Eduardo Colon Santana
*Assistant Examiner* — Bickey Dhakal
(74) *Attorney, Agent, or Firm* — Sterne, Kessler, Goldstein & Fox P.L.L.C.

(57) ABSTRACT

A motor control device determines a rotation angle and an angular speed of a motor, and has: a correcting unit including N number (N is an positive integer equal to or more than 2) of bit-shift circuits, which divide the angular speed by powers of 2 by bit shift, and a circuit, which subtracts output values of the second to Nth bit-shift circuits from an output value of the first bit-shift circuit to determine a correction amount for the rotation angle and correct the rotation angle by the correction amount; so as to determine two-phase direct voltages to obtain a target torque from the three-phase alternate currents passing through the motor according to the angular speed, and convert the two-phase direct voltages into the three-phase alternate voltages according to the sine, cosine of the corrected rotation angle.

7 Claims, 14 Drawing Sheets

FIG. 3

| BIT-SHIFT CIRCUIT | NUMBER OF BITS TO BE SHIFTED | OUTPUT VALUE | TARGET VALUE |
|---|---|---|---|
| BS1 | 3 - BIT | $\omega$ x  0.125 | $\omega$ x  0.10681152 |
| BS2 | 6 - BIT | $\omega$ x  0.015625 | $\omega$ x  0.01818848 |
| BS3 | 9 - BIT | $\omega$ x  0.001953125 | $\omega$ x  0.00256348 |
| BS4 | 11 - BIT | $\omega$ x  0.000488281 | $\omega$ x  0.00061036 |
| BS5 | 13 - BIT | $\omega$ x  0.00012207 | $\omega$ x  0.00012207 |

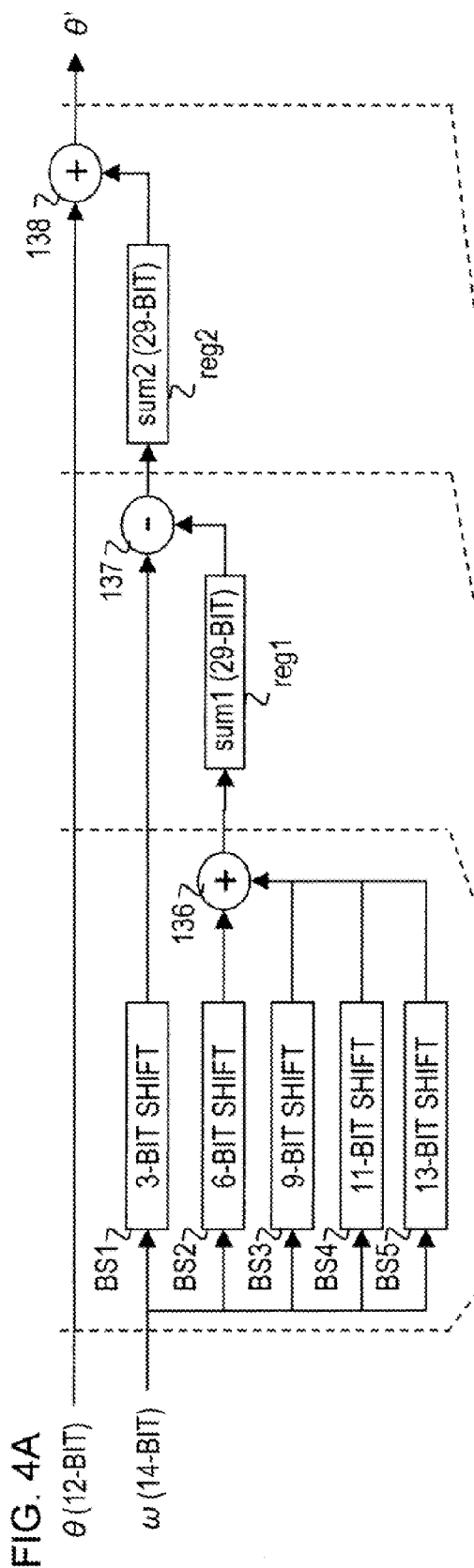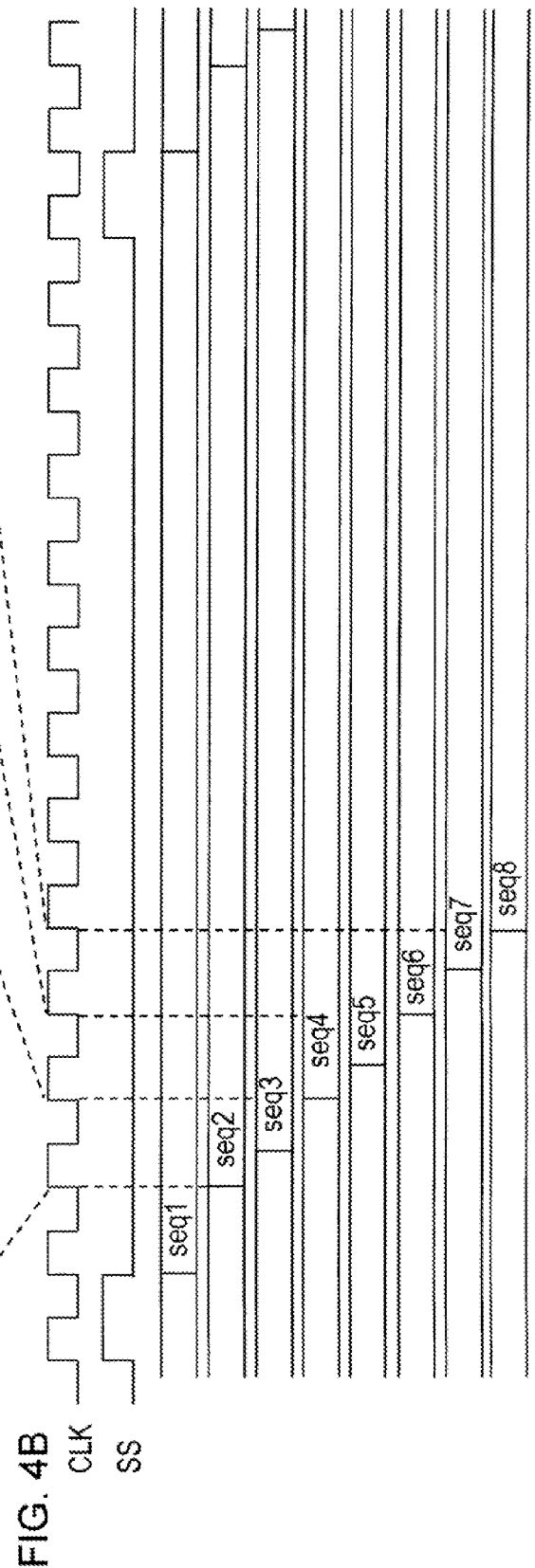

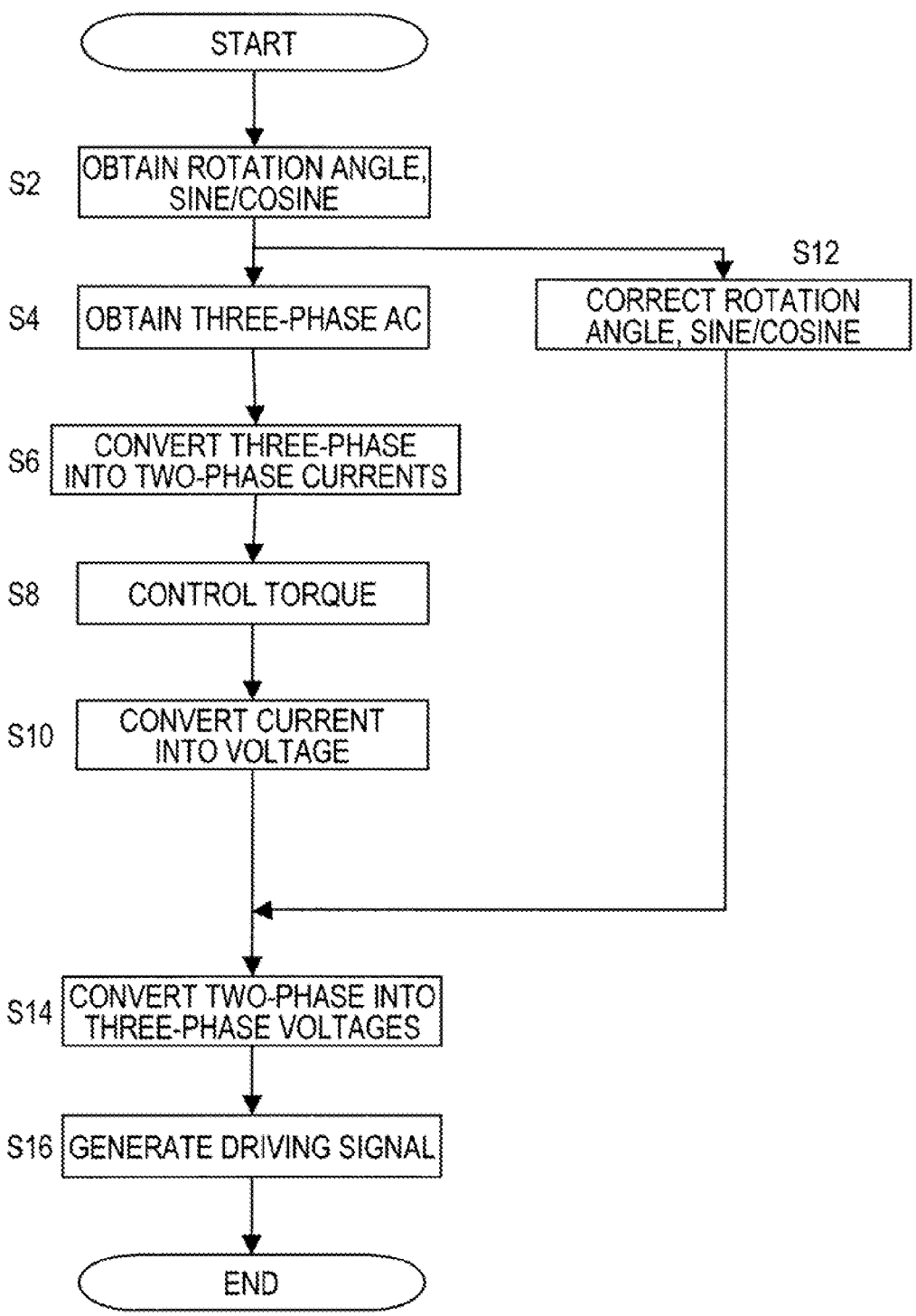

FIG. 11A

| n | 2^(-n) |   | Y |
|---|---|---|---|
| 2 | 0.25 | > | 0.106894 |
| 3 | 0.125 | > | 0.106894 |
| 4 | 0.0625 | ≤ | 0.106894 |

FIG. 11B

| n | Z(n) | α(n) |
|---|---|---|
| 4 | 0.0625 | 0 |
| 5 | 0.03125 | 0 |
| 6 | 0.015625 | 1 |
| 7 | 0.0078125 | 0 |
| 8 | 0.00390625 | 0 |
| 9 | 0.001953125 | 1 |
| 10 | 0.000976563 | 0 |
| 11 | 0.000488281 | 1 |
| 12 | 0.000244141 | 0 |
| 13 | 0.00012207 | 0 |
| 14 | 6.10352E-05 | 1 |
| 15 | 3.05176E-05 | 1 |
| 16 | 1.52588E-05 | 1 |

FIG. 12A

| n | Y' | | |
|---|---|---|---|
| 4~4 | $Y'=2^{(-3)}$ | = | 0.125 |
| 4~5 | $Y'=2^{(-3)}$ | = | 0.125 |
| 4~6 | $Y'=2^{(-3)}-2^{(-6)}$ | = | 0.109375 |
| 4~7 | $Y'=2^{(-3)}-2^{(-6)}$ | = | 0.109375 |
| 4~8 | $Y'=2^{(-3)}-2^{(-6)}$ | = | 0.109375 |
| 4~9 | $Y'=2^{(-3)}-2^{(-6)}-2^{(-9)}$ | = | 0.107421875 |
| 4~10 | $Y'=2^{(-3)}-2^{(-6)}-2^{(-9)}$ | = | 0.107421875 |
| 4~11 | $Y'=2^{(-3)}-2^{(-6)}-2^{(-9)}-2^{(-11)}$ | = | 0.106933594 |
| 4~12 | $Y'=2^{(-3)}-2^{(-6)}-2^{(-9)}-2^{(-11)}$ | = | 0.106933594 |
| 4~13 | $Y'=2^{(-3)}-2^{(-6)}-2^{(-9)}-2^{(-11)}$ | = | 0.106933594 |
| A1 → 4~14 | $Y'=2^{(-3)}-2^{(-6)}-2^{(-9)}-2^{(-11)}-2^{(-14)}$ | = | (0.106872559) |
| 4~15 | $Y'=2^{(-3)}-2^{(-6)}-2^{(-9)}-2^{(-11)}-2^{(-14)}-2^{(-15)}$ | = | 0.106842041 |
| 4~16 | $Y'=2^{(-3)}-2^{(-6)}-2^{(-9)}-2^{(-11)}-2^{(-14)}-2^{(-15)}-2^{(-16)}$ | = | 0.106826782 |

FIG. 12B

| n | Y' | | |
|---|---|---|---|
| 4~4 | $Y'=2^{(-3)}$ | = | 0.125 |
| 4~5 | $Y'=2^{(-3)}$ | = | 0.125 |
| 4~6 | $Y'=2^{(-3)}-2^{(-5)}$ | = | 0.09375 |
| 4~7 | $Y'=2^{(-3)}-2^{(-5)}$ | = | 0.09375 |
| 4~8 | $Y'=2^{(-3)}-2^{(-5)}$ | = | 0.09375 |
| 4~9 | $Y'=2^{(-3)}-2^{(-6)}-2^{(-8)}$ | = | 0.10546875 |
| 4~10 | $Y'=2^{(-3)}-2^{(-6)}-2^{(-8)}$ | = | 0.10546875 |
| 4~11 | $Y'=2^{(-3)}-2^{(-6)}-2^{(-9)}-2^{(-10)}$ | = | 0.106445313 |
| 4~12 | $Y'=2^{(-3)}-2^{(-6)}-2^{(-9)}-2^{(-10)}$ | = | 0.106445313 |
| 4~13 | $Y'=2^{(-3)}-2^{(-6)}-2^{(-9)}-2^{(-10)}$ | = | 0.106445313 |
| A1 → 4~14 | $Y'=2^{(-3)}-2^{(-6)}-2^{(-9)}-2^{(-11)}-2^{(-13)}$ | = | (0.106811523) |
| 4~15 | $Y'=2^{(-3)}-2^{(-6)}-2^{(-9)}-2^{(-11)}-2^{(-14)}-2^{(-14)}$ | = | 0.106811523 |
| 4~16 | $Y'=2^{(-3)}-2^{(-6)}-2^{(-9)}-2^{(-11)}-2^{(-14)}-2^{(-15)}-2^{(-15)}$ | = | 0.106811523 |

FIG. 13A

| n | 2^(-n) |   | Y |
|---|---|---|---|
| 2 | 0.25 | > | 0.128179 |
| 3 | 0.125 | ≤ | 0.128179 |

FIG. 13B

| n | Z(n) | α(n) |
|---|---|---|
| 3 | 0.125 | 0 |
| 4 | 0.0625 | 1 |
| 5 | 0.03125 | 1 |
| 6 | 0.015625 | 1 |
| 7 | 0.0078125 | 1 |
| 8 | 0.00390625 | 1 |
| 9 | 0.001953125 | 0 |
| 10 | 0.000976563 | 0 |
| 11 | 0.000488281 | 1 |
| 12 | 0.000244141 | 0 |
| 13 | 0.00012207 | 1 |
| 14 | 6.10352E-05 | 1 |
| 15 | 3.05176E-05 | 1 |
| 16 | 1.52588E-05 | 1 |

FIG. 14A

| n | Y' | |
|---|---|---|
| 3~3 | Y'=2^(-2) | ≈ 0.25 |
| 3~4 | Y'=2^(-2)-2^(-4) | ≈ 0.1875 |
| 3~5 | Y'=2^(-2)-2^(-4)-2^(-5) | ≈ 0.15625 |
| 3~6 | Y'=2^(-2)-2^(-4)-2^(-5)-2^(-6) | ≈ 0.140625 |
| 3~7 | Y'=2^(-2)-2^(-4)-2^(-5)-2^(-6)-2^(-7) | ≈ 0.1328125 |
| 3~8 | Y'=2^(-2)-2^(-4)-2^(-5)-2^(-6) -2^(-7) -2^(-8) | ≈ 0.12890625 |
| 3~9 | Y'=2^(-2)-2^(-4)-2^(-5)-2^(-6) -2^(-7) -2^(-8) | ≈ 0.12890625 |
| 3~10 | Y'=2^(-2)-2^(-4)-2^(-5)-2^(-6) -2^(-7) -2^(-8) | ≈ 0.12890625 |
| 3~11 | Y'=2^(-2)-2^(-4)-2^(-5)-2^(-6) -2^(-7) -2^(-8) -2^(-11) | ≈ 0.128417969 |
| 3~12 | Y'=2^(-2)-2^(-4)-2^(-5)-2^(-6) -2^(-7) -2^(-8) -2^(-11) | ≈ 0.128417969 |
| 3~13 | Y'=2^(-2)-2^(-4)-2^(-5)-2^(-6) -2^(-7) -2^(-8) -2^(-11)-2^(-13) | ≈ 0.128295898 |
| 3~14 | Y'=2^(-2)-2^(-4)-2^(-5)-2^(-6) -2^(-7) -2^(-8) -2^(-11) -2^(-13)-2^(-14) | ≈ 0.128234863 |
| 3~15 | Y'=2^(-2)-2^(-4)-2^(-5)-2^(-6) -2^(-7) -2^(-8) -2^(-11) -2^(-13)-2^(-14) -2^(-15) | ≈ 0.128204346 |
| B1 → 3~16 | Y'=2^(-2)-2^(-4)-2^(-5)-2^(-6) -2^(-7) -2^(-8) -2^(-11) -2^(-13)-2^(-14) -2^(-15)-2^(-16) | ≈ (0.128189087) |

FIG. 14B

| n | Y' | |
|---|---|---|
| 3~3 | Y'=2^(-2) | ≈ 0.25 |
| 3~4 | Y'=2^(-2)-2^(-3) | ≈ 0.125 |
| 3~5 | Y'=2^(-2)-2^(-4)-2^(-4) | ≈ 0.125 |
| 3~6 | Y'=2^(-2)-2^(-4)-2^(-5)-2^(-5) | ≈ 0.125 |
| 3~7 | Y'=2^(-2)-2^(-4)-2^(-5)-2^(-6)-2^(-6) | ≈ 0.125 |
| 3~8 | Y'=2^(-2)-2^(-4)-2^(-5)-2^(-6) -2^(-7) -2^(-7) | ≈ 0.125 |
| 3~9 | Y'=2^(-2)-2^(-4)-2^(-5)-2^(-6) -2^(-7) -2^(-7) | ≈ 0.125 |
| 3~10 | Y'=2^(-2)-2^(-4)-2^(-5)-2^(-6) -2^(-7) -2^(-7) | ≈ 0.125 |
| 3~11 | Y'=2^(-2)-2^(-4)-2^(-5)-2^(-6) -2^(-7) -2^(-8) -2^(-10) | ≈ 0.127929688 |
| 3~12 | Y'=2^(-2)-2^(-4)-2^(-5)-2^(-6) -2^(-7) -2^(-8) -2^(-10) | ≈ 0.127929688 |
| 3~13 | Y'=2^(-2)-2^(-4)-2^(-5)-2^(-6) -2^(-7) -2^(-8) -2^(-11)-2^(-12) | ≈ 0.128173828 |
| 3~14 | Y'=2^(-2)-2^(-4)-2^(-5)-2^(-6) -2^(-7) -2^(-8) -2^(-11) -2^(-13)-2^(-13) | ≈ 0.128173828 |
| 3~15 | Y'=2^(-2)-2^(-4)-2^(-5)-2^(-6) -2^(-7) -2^(-8) -2^(-11) -2^(-13)-2^(-14) -2^(-14) | ≈ 0.128173828 |
| B1 → 3~16 | Y'=2^(-2)-2^(-4)-2^(-5)-2^(-6) -2^(-7) -2^(-8) -2^(-11) -2^(-13)-2^(-14) -2^(-15)-2^(-15) | ≈ (0.128173828) |

US 8,674,632 B2

MOTOR CONTROL DEVICE WITH A CORRECTING UNIT DETERMINING A CORRECTED ROTATION ANGLE AFTER A PREDETERMINED TIME FROM A DETECTION TIME, CONTROL PROGRAM THEREFOR, AND METHOD FOR THE CONTROL

CROSS-REFERENCE TO RELATED APPLICATION

This application is based upon and claims the benefit of priority of the prior Japanese Patent Application No. 2011-042267, filed on Feb. 28, 2011, the entire contents of which are incorporated herein by reference.

FIELD

Embodiments discussed herein relate to a motor control device, a control program therefore, and a method for the control.

BACKGROUND

A motor control device for controlling a motor monitors driving current passing through the motor and controls driving voltage so that a desired torque is output (for example, in Japanese patent laid-open publications 2004-336913, 2008-273478, and 2009-247181). In case of a tri-alternate-current brush-less motor, a motor control device performs, with a microcomputer, a control process including steps as follows. For example, the first step for obtaining three-phase alternate currents as driving current for a motor and detecting the rotation angle and the angular speed of the motor, the second step for converting, by using the rotation angle, the three-phase alternate currents into two-phase direct currents, the third step for determining two-phase direct voltages to obtain a target torque basing upon the two-phase direct currents and the angular speed, and the fourth step for converting the two-phase direct voltages into three-phase alternate voltages as driving voltage are performed. The motor control device controls the motor by applying thereto the driving voltage determined by such a control process.

Here, in the above fourth step, when the two-phase direct voltages are converted into the three-phase alternate voltages, sine and cosine of the rotation angle of the motor are used as parameters. However, from the detection of the rotation angle at the first step to the fourth step, the processing time for the second and third steps elapses. Then, since the rotor of the motor rotates in the interim, the control by the determined driving voltage lacks accuracy. Hence, a method is proposed such as to correct the rotation angle by a correction amount corresponding to the processing time for the second and third steps, and use the corrected rotation angle in the fourth step.

However, an additional step for correcting the rotation angle would be one of factors to reduce the throughput of the entire control process.

SUMMARY

According to one embodiment, a motor control device includes: a first determining unit which determines a rotation angle and an angular speed of a motor according to a signal indicating a rotation position of the motor; a correcting unit which includes N number (N is an positive integer equal to or more than 2) of bit-shift circuits that divide the angular speed by powers of 2 and includes a circuit that subtracts output values of the second to Nth bit-shift circuits from an output value of the first bit-shift circuit to determine a correction amount; a second determining unit which determines first sine and first cosine corresponding to the rotation angle and determines second sine and second cosine corresponding to the corrected rotation angle; a processing unit which performs a first conversion process for converting three-phase alternate currents of the motor into two-phase direct currents, a control process for determining two-phase direct voltages from the two-phase direct currents, and a second conversion process for converting the two-phase direct voltages into the three-phase alternate voltages; and a generating unit which generates three-phase alternate voltages for the motor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a drawing for illustrating the number of bits to be shifted by a bit-shift circuit and an output value thereof;

FIGS. 4A and 4B are drawings for illustrating another configuration example of the rotation-angle correcting unit;

FIG. 5 is a flow-chart diagram illustrating operation steps of the motor control device;

FIGS. 11A and 11B are drawings for illustrating processes by the information processing device;

FIGS. 12A and 12B are drawings for illustrating processes by the information processing device;

FIGS. 13A and 13B are drawings for illustrating processes by the information processing device under a different condition; and FIGS. 14A and 14B are drawings for illustrating processes by the information processing device under a different condition.

DESCRIPTION OF EMBODIMENTS

Figure 1:
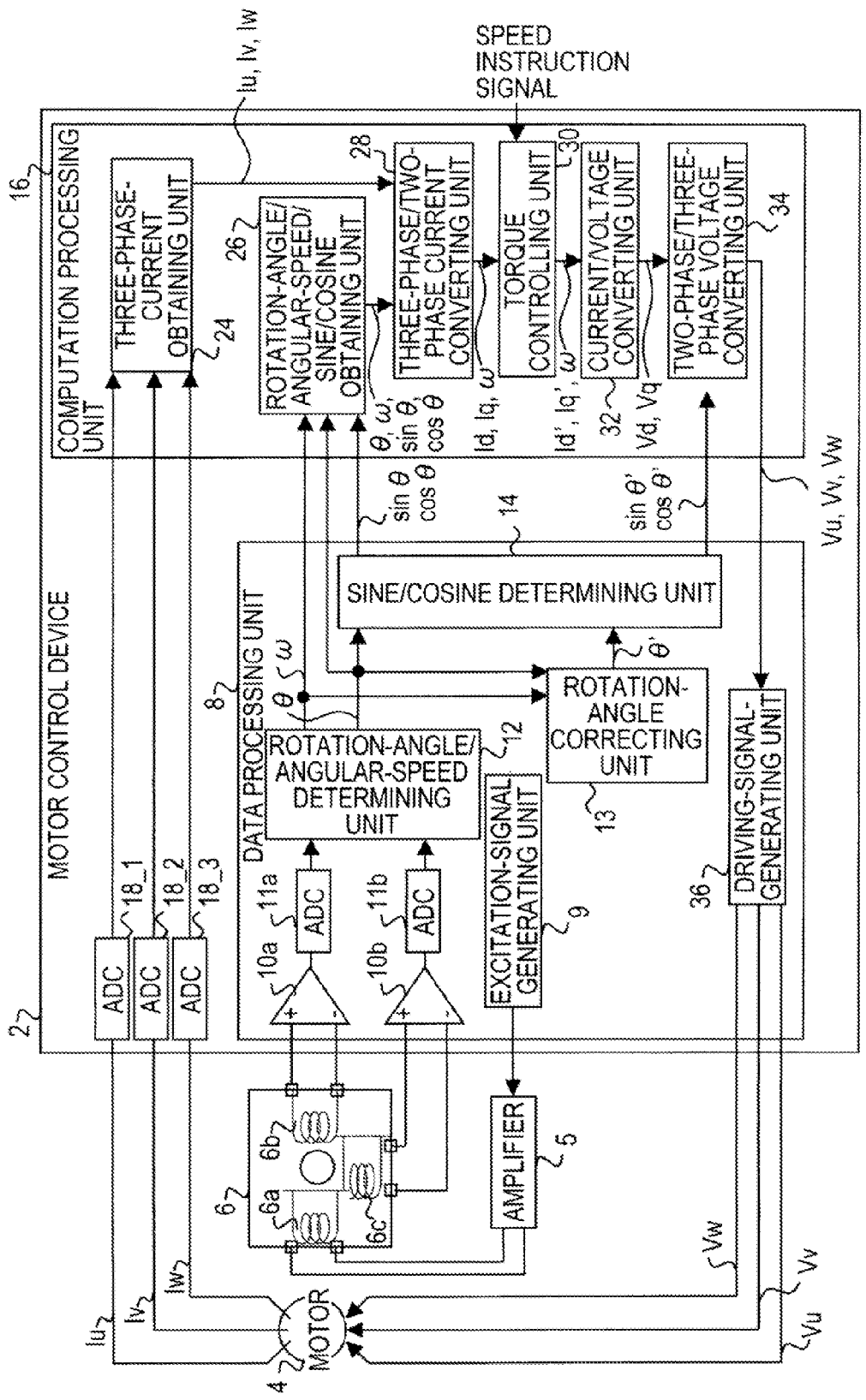
FIG. 1 is a drawing for illustrating a configuration example of a motor control device of an embodiment.

FIG. 1 is a drawing for illustrating a configuration example of a motor control device of one embodiment. A motor control device 2 controls a motor 4. The motor 4 includes, for example, a three-phase alternate-current brush-less motor. The motor 4 includes stator coils, which are provided with three-phase alternate currents having U-, V-, and W-phases shifted from one another by $2\pi/3$ and generate thereby magnetic field, and a rotor with a permanent magnet, which rotates by being attracted and repelled within the magnetic field the stator coils generate. The motor 4 is, for example, loaded on a vehicle and used as an actuator of a part of the vehicle body or as a driving motor of the vehicle.

In adjacent to the motor 4, there is equipped a rotation-angle detecting device 6, which generates a signal indicating a rotation position of the motor 4. The rotation position of the motor 4 corresponds to, for example, a position on the periphery of the rotor, which changes according to the rotation of the rotor of the motor 4. The signal indicating the rotation position of the motor 4 indicates the rotation position of the rotor. Here, the rotation-angle detecting device 6 includes a resolver. At the rotation-angle detecting device 6, an exciting coil 6a coordinating with the rotor of the motor 4 excites a pair of detecting coils 6b, 6c by an input excitation signal. The pair of detecting coils 6b, 6c output signals having phases shifted from each other according to the rotation position of the rotor.

The motor control device 2 includes a signal processing unit 8, which processes signals output from the rotation-angle detecting device 6 and generates data for controlling the motor 4, and a computation processing unit 16, which performs a computation process for controlling the motor 4 according to the data generated by the signal processing unit 8. The motor control device 2 includes, for example, an MCU (Micro Control Unit). Here, the signal processing unit 8 includes a resolver-digital converter. Also, the computation processing unit 16 includes, for example, a CPU (Central Processing Unit), which performs control, processes according to a control program.

The signal processing unit 8 includes an excitation-signal generating circuit 9, power amplifiers 10a, 10b, AD (analog-to-digital) converters 11a, 11b, a rotation-angle/angular-speed determining unit 12, a rotation-angle correcting unit 13, a sine/cosine determining unit 14, and a driving-signal generating unit 36. The excitation-signal generating circuit 9 generates excitation signals and provides the same to the exciting coil 6a of the rotation-angle detecting device 6. The excitation signal is amplified by the amplifier 5 and input into the rotation-angle detecting device 6. Output signals of the rotation-angle detecting device 6 are amplified by the amplifiers 10a, 10b and converted by AD converters 11a, 11b into digital signals. The AD converters 11a, 11b include, for example, 12-bit AD converters. Thereby, 12-bit data indicating the rotation angle of the motor 4 is generated.

The rotation-angle/angular-speed determining unit 12 determines a rotation angle $\theta$ and an angular speed $\omega$ of the motor, according to the signal indicating the rotation position of the motor 4 output from the rotation-angle detecting device 6. The rotation angle $\theta$ is derived from, for example, an angle corresponding to a change amount of the rotation position. The angular speed $\omega$ is derived from, for example, time rate of change of the rotation angle $\theta$. The rotation angle $\theta$ is input into the rotation-angle correcting unit 13, the sine/cosine determining unit 14, and the computation processing unit 16. Here, the rotation angle $\theta$ is, for example, 12-bit data. Also, the angular speed $\omega$ is input into the rotation-angle correcting unit 13 and the computation processing unit 16. Here, the angular speed $\omega$ is, for example, 16-bit data.

The rotation-angle correcting unit 13 determines, on the basis of the angular speed $\omega$, the correction amount for the rotation angle $\theta$, and corrects the rotation angle $\theta$ by the correction amount to determine the corrected rotation angle $\theta'$. The configuration of the rotation-angle correcting unit 13 will be explained in detail below. The corrected rotation angle $\theta'$ is input into the sine/cosine determining unit 14.

The sine/cosine determining unit 14 determines, on the basis of the rotation angle $\theta$, the first sine and cosine corresponding to the rotation angle $\theta$, that is, sin $\theta$ and cos $\theta$. Also, the sine/cosine determining unit 14 determines, on the basis of the corrected rotation angle $\theta'$, the second sine and cosine corresponding to the corrected rotation angle $\theta'$, that is, sin $\theta'$ and cos $\theta'$. The sin $\theta$, cos $\theta$ and sin $\theta'$, cos $\theta'$ are input into the computation processing unit 16.

The computation processing unit 16 includes a three-phase-current obtaining unit 24 and a rotational-angle/sine/cosine obtaining unit 26. The three-phase-current obtaining unit 24 obtains three-phase alternate currents Iu, Iv, and Iw passing through the motor 4. The three-phase alternate currents Iu, Iv, and Iw are converted into digital signals by AD converters 18_1-18_3 equipped at the motor control device 2, and taken into the computation processing unit 16. The rotational-angle/sine/cosine obtaining unit 26 obtains the rotation angle $\theta$ from the rotation-angle/angular-speed determining unit 12, and the first sine sin $\theta$, cosine cos $\theta$ and the second sine sin $\theta'$, cosine cos $\theta'$ from the sine/cosine determining unit 14.

Also, the computation processing unit 16 includes a three-phase/two-phase current converting unit 28, a torque control unit 30, a current/voltage converting unit 32, and a two-phase/three-phase voltage converting unit 34. The three-phase/two-phase current converting unit 28 performs the first conversion process for converting the three-phase alternate currents Iu, Iv, and Iw, passing through the motor 4, into the two-phase direct currents Id, Iq, according to sin $\theta$, cos $\theta$.

The torque control unit 30 and the current/voltage converting unit 32 perform control steps for determining, according to the angular speed $\omega$, the two-phase direct voltages Vd, Vq to obtain a target torque from the two-phase direct currents Id, Iq. First, the torque control unit 30 determines, for example, by PID control according to the angular speed $\omega$, the two-phase direct currents Id', Iq' to obtain the target torque from the two-phase direct currents Id, Iq. The target torque value may be previously set, or determined by a computation process basing upon an input from outside. For example, if the motor 4 is used as a driving motor of a vehicle, a travel-speed instruction signal to the vehicle is input into the motor control device 2, and, basing thereupon, the torque control unit 30 determines the target torque. Next, the current/voltage converting unit 32 converts, according to the angular speed $\omega$, the two-phase direct currents Id', Iq' into the two-phase direct voltages Vd, Vq.

The two-phase/three-phase voltage converting unit 34 performs the second conversion process for converting, according to sin $\theta'$, cos $\theta'$, the two-phase direct voltages Vd, Vq into three-phase alternate voltages Vu, Vv, and Vw. The three-phase alternate voltages Vu, Vv, and Vw are input into the signal processing unit 8.

At the signal processing unit 8, the driving-signal generating unit 36 generates and applies to the motor 4 the three-phase alternate voltages Vu, Vv, and Vw. The driving-signal generating unit 36 includes, for example, a PWM (pulse width modulator), which generates a pulse signal corresponding to the three-phase alternate voltages Vu, Vv, and Vw. Thereby, the motor 4 is controlled so as to output the target torque.

Incidentally, an example is described here, such that the rotation-angle detecting device 6 includes a resolver, however, the rotation-angle detecting device 6 may include, for example, a rotary encoder, which outputs a signal indicating the rotation position of the motor 4. In that case, the rotation-angle/angular-speed determining unit 12 derives from digital signals output from the rotary encoder the rotation angle $\theta$ and the angular speed $\omega$ of the motor 4, according to a signal indicating the rotation angle of the motor 4.

After the rotational-angle/sine/cosine obtaining unit 26 obtains the rotation angle of the motor 4, during a period when the conversion process by the three-phase/two-phase current converting unit 28 and control steps by the torque control unit 30 and the current/voltage converting unit 32 are performed, according to the elapsed time therein, the rotation position of the motor 4 changes. Hence, the rotation-angle correcting unit 13 corrects the rotation angle θ by a correction amount corresponding to such the change amount, and determines the corrected rotation angle θ'. When the processing time by the three-phase/two-phase current converting unit 28, the torque control unit 30, and the current/voltage converting unit 32 is assumed to be "t", a correction amount Δθ for the rotation angle corresponding to the change amount of the rotation position is as follows.

Δθ=ω*t*res2/res1

Here, a resolution res1 of data indicating the rotation angle θ and resolution res2 of data indicating the angular speed ω are taken into consideration in an example explained in the following. If data indicating the rotation angle θ consists of, for example, 12 bits, the resolution res1 per one bit is as follows.

res1=360*2^(−12)=0.0879 (degrees)

Also, if data indicating the angular speed ω consists of 16 bits, among which 14 bits indicate the angular speed ω, and if the maximum value of the angular speed is 40,000 rps (radian per second), the resolution res2 per one bit is as follows.

res2=40,000*2^(−14)=0.261 (rps)

Then, for example, for the processing time t=100μ seconds, the correction amount Δθ is described by the following FORMULA 1.

$$\Delta\theta = \omega * t * res2/res1 \quad \text{[FORMULA 1]}$$
$$= \omega * 0.0001 * 0.261/0.0879$$
$$= \omega * 0.0001 * 1068.94198$$
$$= \omega * 0.106894198$$

Here, according to a method, which will be explained in detail below, the fractional portion of the correction amount Δθ is approximated as follows.

Δθ=ω*0.10681152

Hence, the rotation-angle correcting unit 13 has a configuration so as to compute the following FORMULA 2, and determine the corrected rotation angle θ'.

θ'=θ+Δθ=θ+ω*0.10681152 [FORMULA 2]

Figure 2:
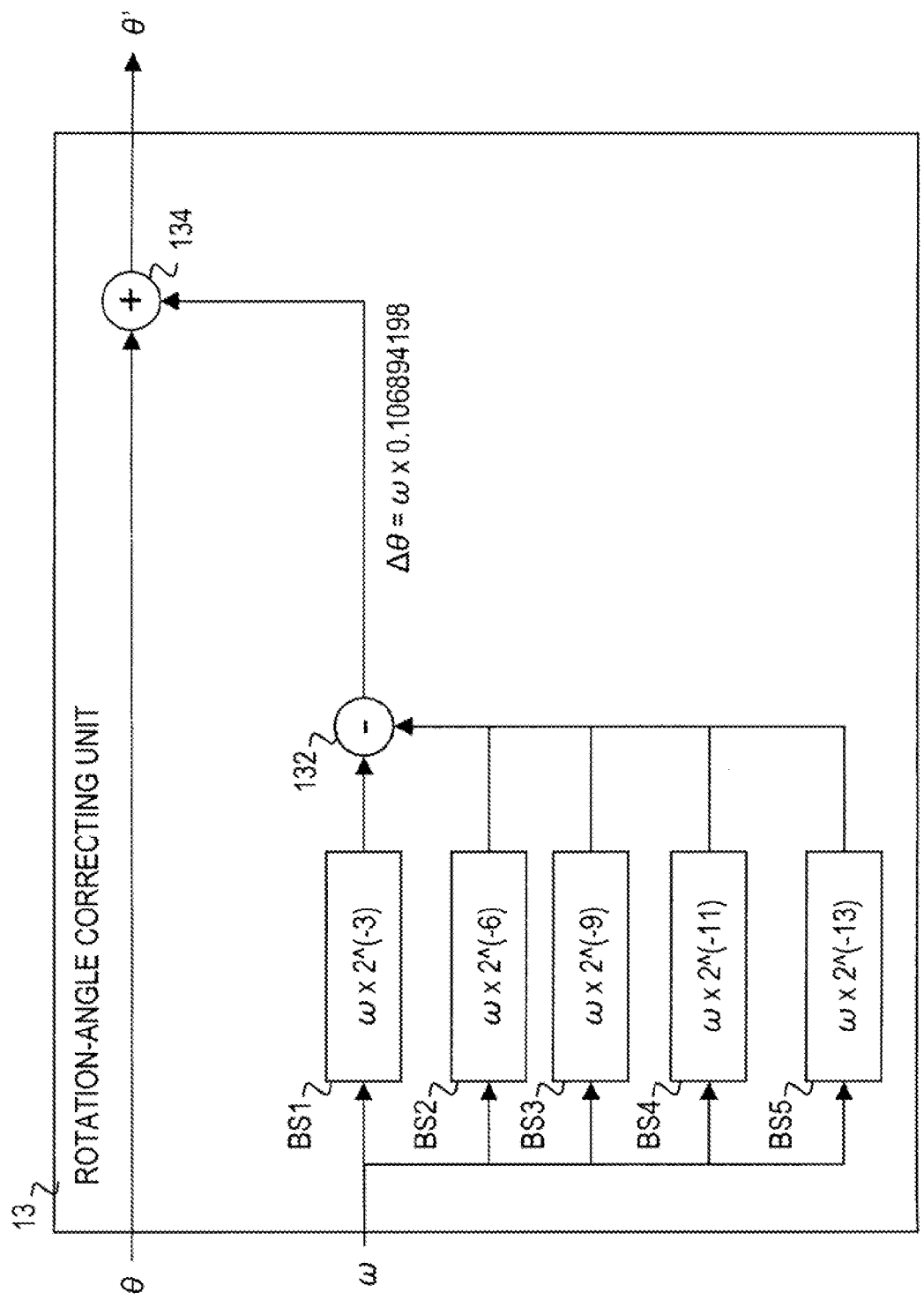
FIG. 2 is a drawing for illustrating a configuration example of a rotation-angle correcting unit.

FIG. 2 is a drawing for illustrating a configuration example of the rotation-angle correcting unit 13. The rotation-angle correcting unit 13 includes five bit-shift circuits BS1-BS5, which sift the bits of the angular speed ω so as to divide the same by powers of two, a subtracting circuit 132, which subtracts the output values of the second-to-fifth bit-shift circuits BS2-BS5 from the output value of the first bit-shift circuit BS1 so as to determine the correction amount Δθ of the rotation angle, and an adding circuit 134, which corrects the rotation angle θ by adding the correction amount Δθ to the rotation angle θ, so as to obtain the corrected rotation angle θ'. The bit-shift circuits BS1-BS5 each shift the angular speed ω to the lower-bit side, and, thereby, divide the angular speed ω by a power of 2. The numbers of bits to be shifted by the bit-shift circuits BS1-BS5 correspond to exponents of the powers of two, by which the angular speed ω is divided.

FIG. 3 is a drawing for illustrating the number of bits to be shifted by each bit-shift circuit and the output value. Each of the bit-shift circuits BS2-BS5 shifts bits of a number larger by one bit than the number of bits shifted by the immediately preceding bit-shift circuit. For example, the numbers of bits to be shifted by the bit-shift circuits BS1-BS5 are respectively 3 bits, 6 bits, 9 bits, 11 bits, and 13 bits.

The number of bits to be shifted by the first bit-shift circuit BS1 is set so that the output value will be equal to, or larger than and the most approximate to a target value. Here, the target value is the correction amount Δθ(=ω*0.10681152). For example, the bit-shift circuit BS1 shifts the angular speed ω to the lower side by 3 bits to divide the angular speed ω by the 3rd power of 2, and outputs the output value "ω*0.125", which is equal to, or larger than and the most approximate to the target value.

The numbers of bits to be shifted by the second-to-fifth bit-shift circuits BS2-BS5 are set so that the output values will be equal to, or less than and the most approximate to the target values. Here, the target values are obtained by subtracting the correction amount Δθ and the output value of the immediately preceding bit-shift circuit from "ω*0.125", the output value of the first bit-shift circuit BS1. For example, the second bit-shift circuit BS2 divides the angular speed ω by the 6th power of 2 by shifting the angular speed ω by 6 bits to the lower side, and outputs the output value "ω*0.015625", which is equal to, or less than and the most approximate to the target value "ω*0.01818848". Then, the third bit-shift circuit BS3 divides the angular speed ω by the 9th power of 2 by shifting the angular speed ω by 9 bits to the lower side, and outputs the output value "ω*0.001953125", which is equal to, or less than and the most approximate to the target value "ω*0.00256348". Then, the fourth bit-shift circuit BS4 divides the angular speed ω by the 11th power of 2 by shifting the angular speed ω by 11 bits to the lower side, and outputs the output value "ω*0.000488281", which is equal to, or less than and the most approximate to the target value "ω*0.00061036". Then, the fifth bit-shift circuit BS5 divides the angular speed ω by the 13th power of 2 by shifting the angular speed ω by 13 bits to the lower side, and outputs the output value "ω*0.00012207", which is equal to, or less than and the most approximate to the target value "ω*0.00012207".

The subtracting circuit 132 subtracts the output values of the second-to-fifth bit-shift circuits BS2-BS5 from the output value of the first bit-shift circuit BS1, so as to determine the correction amount Δθ ("ω*0.10681152") of the rotation angle θ. Then, the adding circuit 134 adds the correction amount Δθ to the rotation angle θ and determines the corrected rotation angle θ'.

The rotation-angle correcting unit 13 performs an approximation of floating-point numbers by the above bit-shift circuit and the adding/subtracting circuit. Therefore, for example, in comparison to a circuit specifically configured for floating-point operation, more simplified circuit configuration is enabled. Further, by performing bit-shift and adding/subtracting operations, computing time is enabled to be shortened comparing with a case of performing multiplication. Hence, even when correcting the rotation angle θ, the throughput is enhanced.

FIGS. 4A and 4B are drawings for illustrating another configuration example of the rotation-angle correcting unit 13 and operations thereof. In FIG. 4A, the rotation-angle correcting unit 13 includes an adding circuit 136, which adds up the output values of the bit-shift circuits BS2-BS5, a register reg1, which stores the addition result sum1 by the adding circuit 136, a subtracting circuit 137, which subtracts the addition result sum1 from the output value of the bit-shift circuit BS1, a register reg2, which stores the subtraction result sum2 by the subtracting circuit 137, and an adding circuit 138, which adds the subtraction result sum2 to the rotation angle θ.

Here, the rotation angle θ is 12-bit data. Also, the angular speed ω is 16-bit data. The bit-shift circuits BS2-BS5 shift the 16-bit angular speed ω by, at most, 13 bits to the lower side. Therefore, the data length of the output values of the bit-shift circuits BS2-BS5 is 29 bits. Hence, the register reg1 stores the 29-bit addition result sum1. On the other hand, the output value of the bit-shift circuit BS1, which shifts the angular speed ω by 3 bits to the lower side, has 19 bits. The subtracting circuit 137 generates, for example, the two's complement of the 29-bit addition result sum1 and adds the same to the output value of the bit-shift circuit BS1, thus performing subtraction. Hence, the register reg2 stores the 29-bit subtraction result sum2. Then, the adding circuit 138 rounds down, for example, the least 14 bits of the subtraction result sum2, and adds the most significant 15 bits to the 12-bit rotation angle θ. Then, the most significant 12 bits are selected, and thus the corrected rotation angle θ' approximated within 12 bits is output.

FIG. 4B is a timing-chart diagram for illustrating operational timings of the rotation-angle correcting unit 13 illustrated in FIG. 4A. In FIG. 4B, there are illustrated an operational clock CLK of the rotation-angle correcting unit 13, and data-acquisition starting signal SS input from the driving circuit of the motor 4 into the signal processing unit 8 every, for example, tens of micro seconds. In sync with falling of the data-acquisition starting signal SS, operational sequence as below is started. The operational sequence described below is repeatedly performed on every input of the data-acquisition starting signal SS.

First, the bit-shift circuits BS1-BS5 obtain the angular speed ω (seq1). Then, in sync with rising of the subsequent clock, the bit-shift circuits BS1-BS5 each perform bit-shift (seq2), and the adding circuit 136 adds up the output values of the bit-shift circuits BS2-BS5 (seq3). Then, in sync with rising of the subsequent clock, the subtracting circuit 137 generates a two's complement of the addition result sum1 (seq4), and adds the same to the output value of the bit-shift circuit BS1 (seq5). Then, in sync with rising of the subsequent clock, the adding circuit 138 rounds down the least 14 bits of the subtraction result sum2 (seq6), and adds the subtraction result sum2 to the rotation angle θ (seq7). Then, in sync with rising of the subsequent clock, the adding circuit 138 outputs the corrected rotation angle θ' (seq8).

FIG. 5 is a flow-chart diagram illustrating operation steps of the motor control device. Steps in FIG. 5 are performed, for example, in every control cycle of tens of micro seconds.

First, at a step S2, the rotation-angle/angular-speed determining unit 10 determines the rotation angle θ and the angular speed ω of the motor 4, and the sine/cosine determining unit 14 determines sine sin θ and cosine cos θ corresponding to the rotation angle. Then the rotational-angle/sine/cosine obtaining unit 26 obtains the rotation angle θ from the rotation-angle/angular-speed determining unit 10 and sin θ, cos θ from the sine/cosine determining unit 14.

Then, at a step S4, the three-phase-current obtaining unit 24 obtains the three-phase alternate currents Iu, Iv, and Iw, passing through the motor 4. Then, at a step S6, a three-phase/two-phase current converting unit 28 converts, according to sin θ, cos θ, the three-phase alternate currents Iu, Iv, and Iw into the two-phase direct currents Id, Iq. Then, at a step S8, the torque control unit 30 performs a torque control for obtaining the target torque, according to the angular speed ω, by determining, from the two-phase direct currents Id, Iq, the two-phase direct voltages Id', Iq'. Then, at a step S10, the current/voltage converting unit 32 converts, according to the angular speed ω, the two-phase direct currents Id', Iq' into the two-phase direct voltages Vd, Vq.

On the other hand, in parallel to the steps S4-S10, at a step S12, the rotation-angle correcting unit 13 determines the corrected rotation angle θ', and the sine/cosine determining unit 14 determines sin θ', cos θ' from the corrected rotation angle θ'. Then, the two-phase/three-phase voltage converting unit 34 obtains sin θ', cos θ' from the sine/cosine determining unit 14. Then, at a step S14, the two-phase/three-phase voltage converting unit 34 converts, according to sin θ', cos θ', the two-phase direct voltages Vd, Vq into the three-phase alternate voltages Vu, Vv, and Vw. Then, at a step S16, the driving-signal generating unit 36 generates the three-phase alternate voltages Vu, Vv, and Vw, and applies the same to the motor 4. Such the steps S2-S16 are repeated, and thereby a control is performed so that the motor 4 outputs the target torque.

Figure 6:
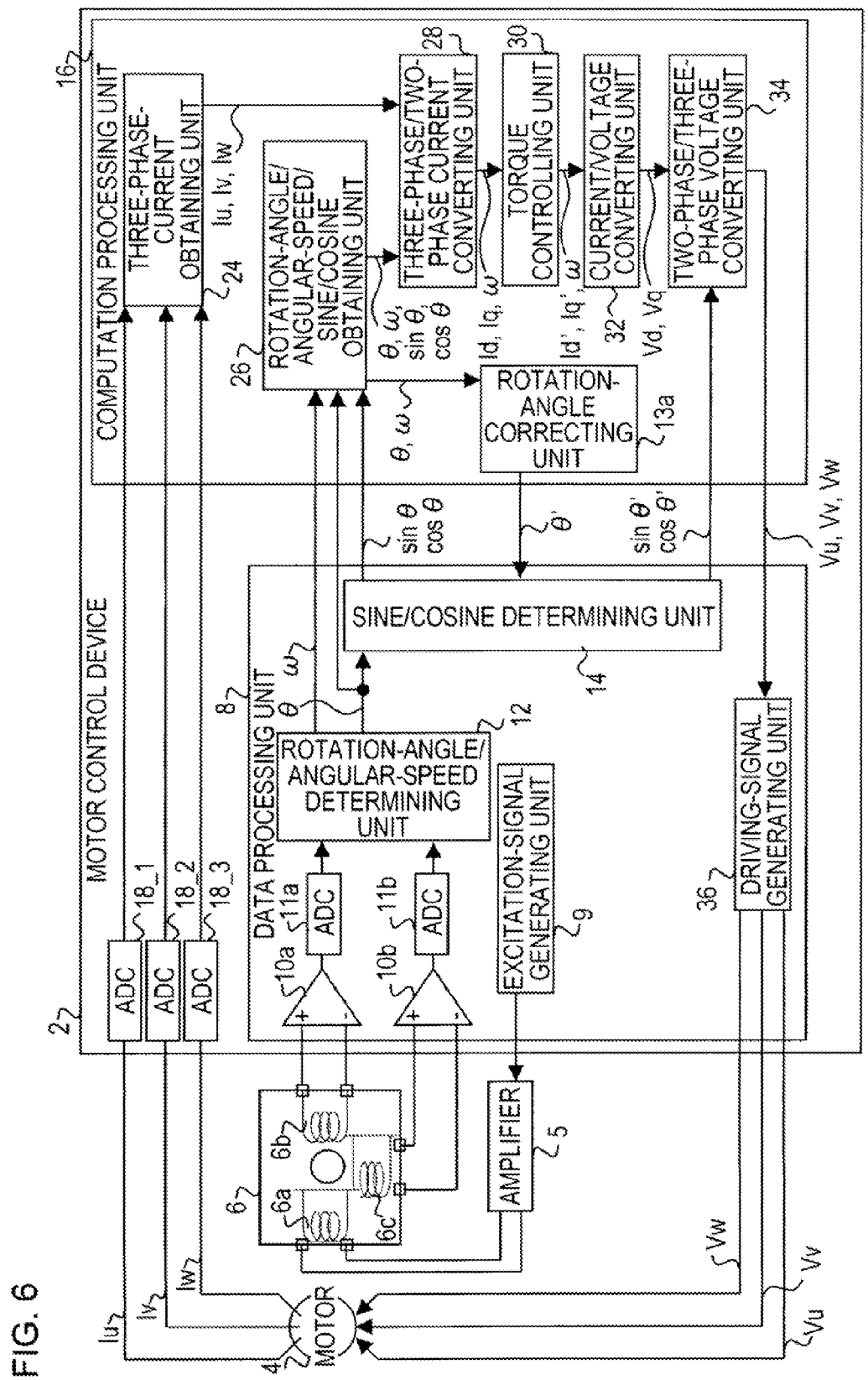
FIG. 6 is a drawing for illustrating a configuration of a motor control device in a comparative example.
Figure 7:
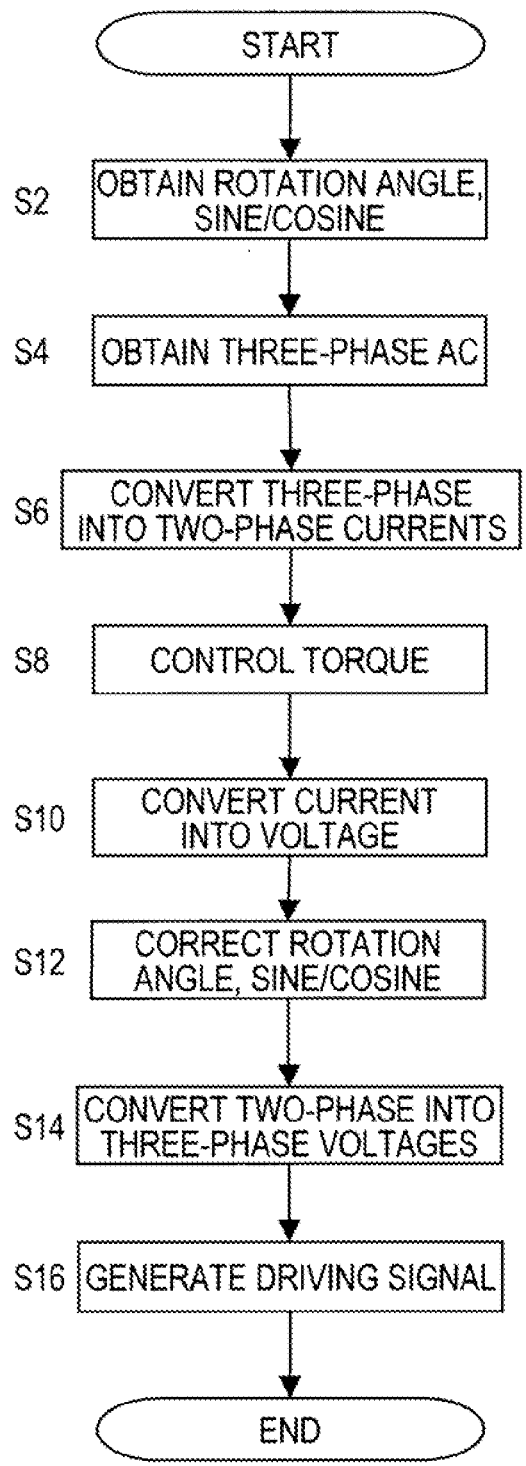
FIG. 7 is a flow-chart diagram illustrating operation steps of the motor control device of FIG. 6.

FIG. 6 and FIG. 7 illustrate examples to be compared with the present embodiment.

FIG. 6 illustrates a configuration of the motor control device 2 of the comparative example. In this example, instead of the signal processing unit 8 having the rotation-angle correcting unit 13, the computation processing unit 16 has a rotation-angle correcting unit 13a, which performs the rotation-angle correcting process. For example, the computation processing unit 16, as the rotation-angle correcting unit 13a, performs the rotation-angle correcting process according to a control program. The rotation-angle correcting unit 13a obtains the rotation angle θ from the rotational-angle/sine/cosine obtaining unit 26, and performs a computation process to obtain the corrected rotation angle θ'. Then, the rotation-angle correcting unit 13a sends the corrected rotation angle θ' to the sine/cosine determining unit 14. Then, the sine/cosine determining unit 14 determines sin θ', cos θ' from the corrected rotation angle θ', and returns the same to the two-phase/three-phase voltage converting unit 34. As such, the two-phase/three-phase voltage converting unit 34 obtains sin θ', cos θθ' corresponding to the corrected rotation angle θ'.

FIG. 7 is a flow-chart diagram for illustrating operation steps of the motor control device illustrated in FIG. 6. In FIG. 7, the step S12 is, instead of being performed in parallel to the steps S4-S10, inserted after the step S10. At the step S12, the rotation-angle correcting unit 13a determines the corrected rotation angle θ', and sends the corrected rotation angle θ' to the sine/cosine determining unit 14. Then, two-phase/three-phase voltage converting unit 34 obtains sin θ', cos θ' corresponding to the corrected rotation angle θ' from the sine/cosine determining unit 14.

When comparing the processing steps of FIG. 5 with the processing steps of FIG. 7, the processing time of the steps of FIG. 5 is reduced to be shorter than the processing steps of FIG. 7, by processing the steps S4-S10 and the step S12 in parallel. As such, the motor control device 4 of this embodiment, having the rotation-angle correcting unit 13 separately from the computation processing unit 16, performs the rotation-angle correcting process in parallel to the processes by the computation processing unit 16. Hence, when correcting the rotation angle, the throughput is enhanced.

Next, a method for determining the number of the bit-shift circuits of the rotation-angle correcting unit 13 and the number of bits to be shifted by each bit-shift circuit. Here, an example will be described, in which the correction amount $\Delta\theta=\omega*0.10681152$. Also, the angular speed $\omega$ is represented by 16-bit data.

At the first process, the number of bits to be shifted by the first bit-shift circuit BS1 is determined. At the first process, with a correction coefficient "0.10681152" corresponding to the correction amount $\Delta\theta$ being a target value, a power of 2 is determined, which is equal to, or more than and the most approximate to the target value. Here, corresponding to the exponent of the determined power of 2, the number of bits to be shifted by the first bit-shift circuit BS1 is determined.

Then, at the second-to-sixteenth (the number of bits of data indicating the angular speed $\omega$) processes, the numbers of bits to be shifted by the second and the subsequent bit-shift circuits are determined. Among the second-to-sixteenth processes, at the ith process (i is equal to or more than 2, and equal to or less than 16), with a value, obtained by subtracting the correction coefficient "0.10681152" from sum of the powers of two determined in the past processes, being the target value, a power of 2 is determined, which is equal to, or less than and the most approximate to the target value. Then, according to the exponent of the determined power of 2, the number of bits to be shifted by the ith bit-shift circuit is determined.

Figure 8:
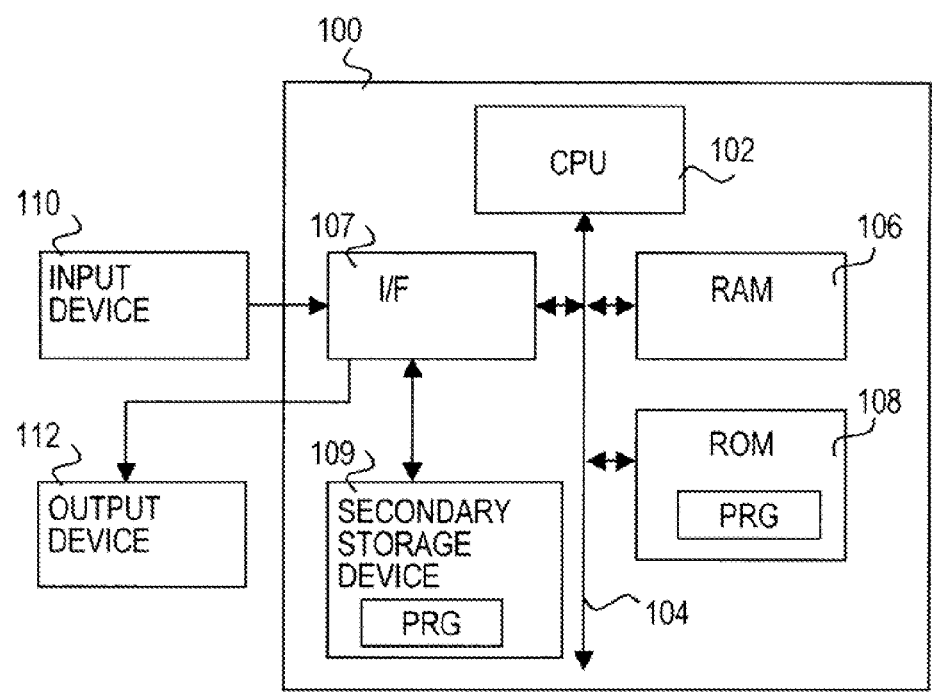
FIG. 8 is a drawing for illustrating the number of the bit-shift circuits of the rotation-angle correcting unit and an configuration example of an information processing device for determining the number of bits to be shifted by the bit-shift circuit.

FIG. 8 illustrates the configuration example of the information processing device, which determines by the above method the number of the bit-shift circuits of the rotation-angle correcting unit 13 and the number of bits to be shifted by each bit-shift circuit. The information processing device 100 includes, for example, a personal computer. The information processing device 100 has a CPU 102, a RAM (Random Access Memory) 106, a ROM (Read Only Memory) 108, and an interface 107, connected via a bus 104 with one another. To the interface 107, an input device 110, an output device 112, and a secondary storage device 109 are connected. The input device 110 includes, for example, a key board and/or a pointing device. The output device 112 includes, for example, a displaying apparatus such as a display monitor. The secondary storage device 109 includes, for example, a storage device such as a hard disk.

The CPU 102, in response to an instruction input from the input device 110, reads out to RAM 106 and executes a processing program PRG stored in the ROM 108 or the secondary storage device 109. Thereby, steps for determining the number of the bit-shift circuits of the rotation-angle correcting unit 13 and the number of bits to be shifted by each bit-shift circuit are performed.

Figure 9:
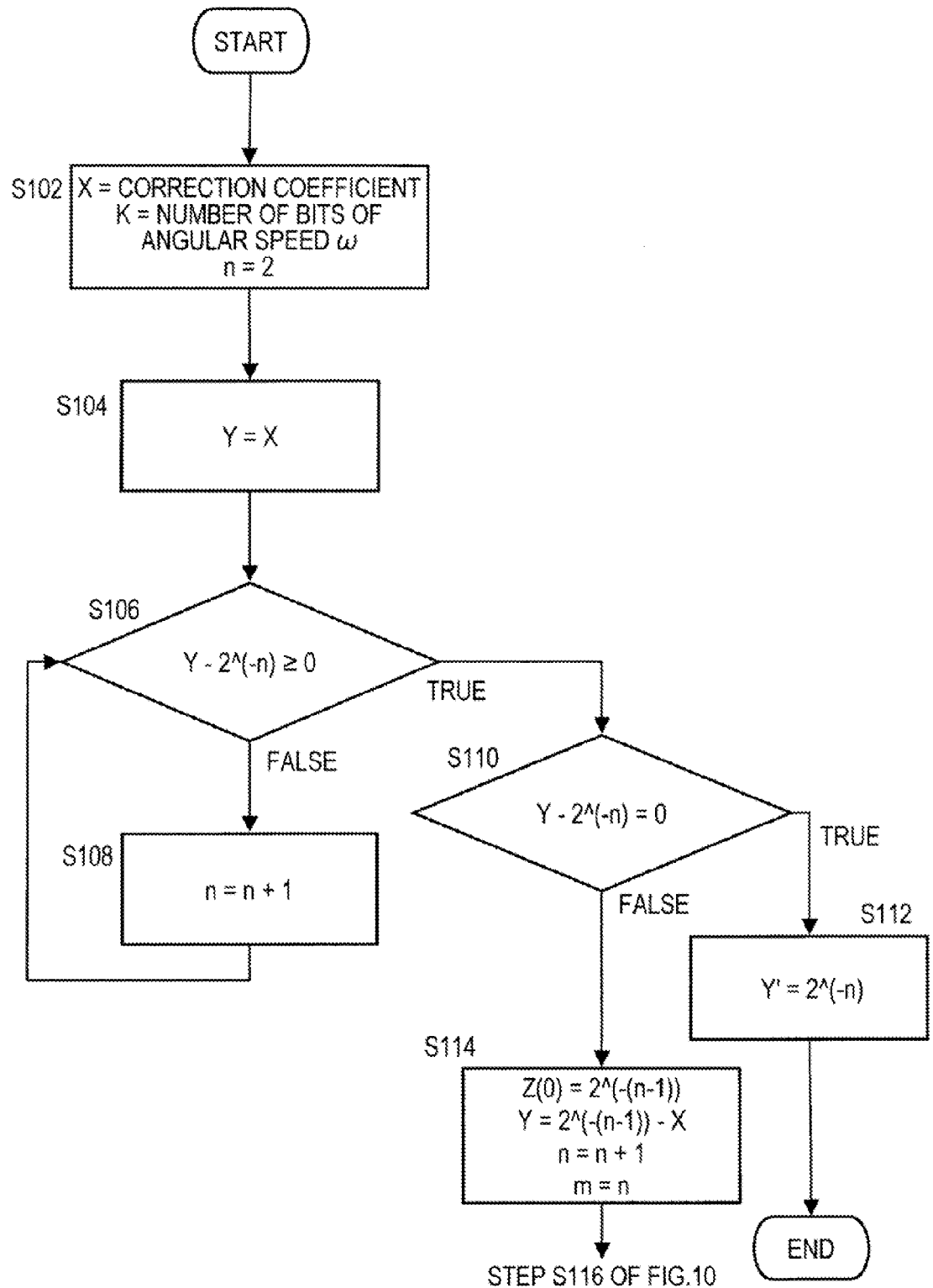
FIG. 9 is a flow-chart diagram for illustrating operation steps of the information processing device.
Figure 10:
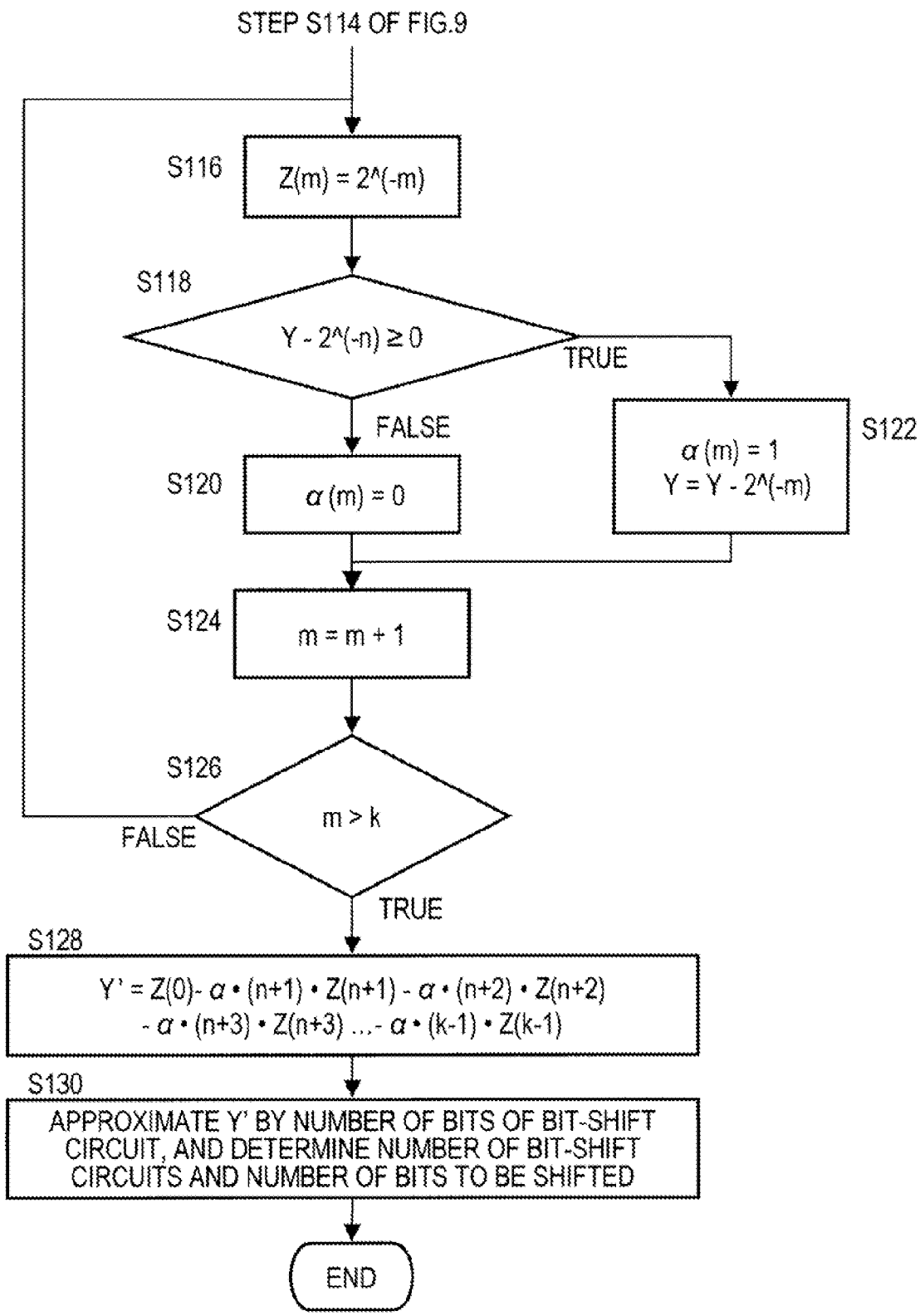
FIG. 10 is a flow-chart diagram for illustrating operation steps of the information processing device.

FIG. 9 and FIG. 10 are flow-chart diagrams illustrating operation steps by the information processing device 100. The steps of FIG. 9 correspond to steps for determining the number of bits to be shifted by the first bit-shift circuit BS1. Here, the correction amount $\Delta\theta$ is represented by the following FORMULA 3.

$$\Delta\theta=\omega*[Z(0)-(\alpha(1)*2^{(-1)})+\alpha(2)*2^{(-2)}+\alpha(3)*2^{(-3)}+\ldots+\alpha(k)*2^{(-k)}] \quad \text{[FORMULA 3]}$$

Here, k is "16", the number of bits of the angular speed $\omega$. Also, among multipliers to the angular speed $\omega$, the first term $Z(0)$ corresponds to the power of 2 by the bit-shift circuit BS1. Also, the $\alpha(j)(j=2-k)$ represents either existence, "1", or non-existence, "0", of the bit-shift circuit, which computes the $-j$th power of 2.

The information processing device 100 performs setting of various kinds of variables (S102). A work variable X is set to be "0.106894198", a correction coefficient for the correction amount "$\omega*0.106894198$" before the approximation, as represented by the above FORMULA 1. A work variable k is set to be "14", the number of bits of the angular speed $\omega$. The number of bits of the correction coefficient and the angular speed $\omega$ are, for example, input by an operator into the information processing device 100. Also, a count variable n is set to be "2", the initial value. Then, the information processing device 100 performs setting of a work variable Y (S104). The work variable Y is set to be the value of the work variable X, the correction coefficient "0.106894198". With this value of the work variable Y being the target value, the information processing device 100 increments the count variable n from the initial value "2" by "1" until the $-n$th power of 2 becomes equal to or less than the value of the work variable Y (False at S106, S108).

When the $-n$th power of 2 is equal to or less than the value of the work variable Y (True at S106), particularly when the $-n$th power of 2 is equal to the value of the work variable Y (True at S110), the information processing device 100 sets the value of the work variable Y' to indicate the approximated correction coefficient to be the $-n$th power of 2 (S112), and terminates the process. In this case, the correction coefficient is represented, without being approximated, by a power of 2. On the other hand, when the $-n$th power of 2 is not equal to the value of the work variable Y (False at S110), a step S114 will be performed. At the step S114, the information processing device 100 sets the Z(0) to be $-(n-1)$th power of 2. Here, the number of bits to be shifted by the first bit-shift circuit BS1 is determined as "$n-1$". In this case, there is a difference between the value of the work variable Y and the value of the Z(0). Hence, for performing steps for determining the numbers of bits to be shifted by the second and the subsequent bit-shift circuits, at the step S114, the information processing device 100 sets the value of the work variable Y to be a difference between $-(n-1)$th power of 2 and the value of the work variable X (the correction coefficient "0.106894198"). Thereby, the target values are set for computation results by the second and the subsequent bit-shift circuits. Further, the count variable n is incremented, and a value of a count variable m is set to be the incremented value of the count variable n.

Here, values of the work variable Y, the count variable n, and the $-n$th power of 2, at the time when the steps S102-S112 are performed with the correction coefficient "0.106894198", are illustrated in FIG. 11A. As illustrated in FIG. 11A, for n=2 to 4, when n=4, the $-n$th power of 2 is equal to or less than the value of the work variable Y. Hence, the Z(0) is the $-(n-1)$th power of 2, that is, the $-3$rd power of 2. Hence, the number of bits to be shifted by the first bit-shift circuit BS1 is determined as "3".

Next, steps of FIG. 10 are performed. The steps of FIG. 10 correspond to steps for determining the numbers of bits to be shifted by the second and the subsequent bit-shift circuits. The information processing device 100 sets the work variable Z(m) to be the $-m$th power of 2 (S116). Thereby, the number of bits to be shifted by the second and subsequent bit-shift circuits are set to be larger value than "$n-1$", the number of bits to be shifted by the first bit-shift circuit BS1.

Then, when the $-n$th power of 2 is larger than the value of the work variable Y (False at S118), the term $\alpha(m)$ of FORMULA 3 is set to be "0" (S120). On the other hand, when the $-n$th power of 2 is equal to or less than the value of the work variable Y (True at S118), the term $\alpha(m)$ is set to be "1" (S122). Here, a power of 2 is determined, which is equal to, or less than and the most approximate to the target value. Then, the count variable m is incremented by one (S124). As such, the steps S116-S126 are repeatedly performed until the count variable m reaches k, the number of bits of the angular speed $\omega$ (True at S126). The count variable n, Z(n), and $\alpha(n)$ at this time are illustrated in FIG. 11B. As illustrated in FIG. 11B, when n is "6", "9", "11", and "14"-"16", α becomes "1".

Then, when the count variable m is larger than k, the number of bits of the angular speed ω (False at S126), the information processing device 100 sets the value of the work variable Y' indicating the approximated correction coefficient as below (S128), and terminates the process.

$$Y'=Z(0)-\alpha^*(n+1)^*Z(n+1)-\alpha^*(n+2)^*Z(n+2)-\alpha^*(n+3)$$
$$*Z(n+3)\ldots -\alpha^*(k-1)^*Z(k-1)$$

The values of the work variable Y' for ranges of the variable n, at the time of performing steps S116-S126 with the correction coefficient "0.106894198", are illustrated in FIG. 12A. For n=4 to 16, when n is "6", "9", "11", and "14" to "16", a becomes "1", and thus the work variable Y' is as represented by the following FORMULA 4.

$$Y'=2^{\wedge}(-3)-1*2^{\wedge}(-6)-1*2^{\wedge}(-9)-1*2^{\wedge}(-11)-1*2^{\wedge}(-14)-1*2^{\wedge}(-15)-1*2^{\wedge}(-16)$$ [FORMULA 4]

Further, the information processing device 100 approximates the value of the work variable Y' in digits representable by the number of bits of the bit-shift circuit, and determines the number of the bit-shift circuits and the number of bits to be shifted (S130). The information processing device 100 rounds up by one bit, for example, the number of bits of the last term excluding the first term. Then, the work variable Y' after rounding up is selected, such as to obtain the closest computation result to the computation result with the work variable Y' before rounding up.

For example, in FIG. 12B, illustrated is an example obtained by performing the above step S130 in the example illustrated in FIG. 12A. In FIGS. 12A, 12B, when n=4 to 14 (arrow A1), the values of the work variable Y' obtained by rounding up the number of the bits become the closest to the value of the work variable Y' before rounding up, and the number of terms becomes the minimum. Hence, at this time, the number of the bit-shift circuits is the minimum. Hence, at n=4 to 14, combinations are selected, in which n is "6", "9", "11", or "13". Thereby, the number of the bit-shift circuits is determined as "5", including the first bit-shift circuit. Then, the numbers of bits to be shifted by the bit-shift circuits BS2-BS5 are respectively determined as 6 bits, 9 bits, 11 bits, and 13 bits.

By the information processing device 100 outputting the above processed result, for example, a developer uses the same and develops the rotation-angle correcting unit 13. By the above steps, it is enabled to determine the number of the bit-shift circuits of the rotation-angle correcting unit 13 for computing the correction amount Δθ of the rotation angle θ and the number of bits to be shifted by each bit-shift circuit. By the above steps, the number of the bit-shift circuits is minimized. Hence, without enlarging the circuit size, approximating computation of floating-point numbers by a simplified circuit configuration is possible.

FIG. 13 and FIG. 14 illustrate an example, in which the above steps are performed under a different conditions. Here, an example is illustrated, in which the processing time t of the three-phase/two-phase current converting unit 28, the torque control unit 30, and the current/voltage converting unit 32 is "120" micro seconds. At this time, the correction amount Δθ for the rotation angle is as follows.

$$\Delta\theta = \omega * t * res2 / res1$$

$$= \omega * 0.00012 * 0.261 / 0.0879$$

-continued
$$= \omega * 0.00012 * 1068.94198$$

$$= \omega * 0.1281788314$$

Hence, with the correction coefficient "0.1281788314", the steps of FIG. 9 and FIG. 10 are performed.

The values of the work variable Y, the count variable n, and the -nth power of 2 obtained when performing steps S102-S112 of FIG. 9 under this condition are illustrated in FIG. 13A. Also, the count variable n, the Z(n), and the α(n) obtained when performing the steps S116-S128 of FIG. 10 are illustrated in FIG. 13B. Also, the values of the work variable Y' for ranges of the count variable n are illustrated in FIG. 14A. Then, an example at the time of performing the above step S130 is illustrated in FIG. 14B.

In FIG. 13A, when n=3, the -nth power of 2 is equal to or less than the value of the work variable Y. Therefore, the Z(0) is the -2nd power of 2. Hence, the number of bits to be shifted by the first bit-shift circuit BS1 is determined as "2". Also, in FIG. 13B, when n is "4", "5", "6", "7", "8", "11", "13", "14", "15", and "16", the value of the term α(n) becomes "1". Therefore, the work variable Y' is as represented in the following FORMULA 5.

$$Y'=2^{\wedge}(-2)-1*2^{\wedge}(-4)-1*2^{\wedge}(-5)-1*2^{\wedge}(-6)-1*2^{\wedge}(-7)-$$
$$1*2^{\wedge}(-8)-1*2^{\wedge}(-11)-1*2^{\wedge}(-13)-1*2^{\wedge}(-14)-1*2^{\wedge}$$
$$(-15)-1*2^{\wedge}(-16)$$ [FORMULA 5]

Then, in FIG. 14A, 14B, when n=3 to 16 (arrow B1), the value of the work variable Y' after rounding up the number of bits becomes the closest to the value of the work variable Y' before rounding up, and the number of the bit-shift circuits becomes the minimum. Hence, for n=3 to 16, combinations are selected, in which n is "4", "5", "6", "7", "8", "11", "13", "14", or "15". Thereby, the number of the bit-shift circuits is determined as "11", including the first bit-shift circuit. Then, the numbers of bits to be shifted by the second-eleventh bit-shift circuits are respectively determined as 4 bits. 5 bits. 6 bits. 7 bits, 8 bits, 11 bits, 13 bits, 14 bits, and 15 bits, and the work variable Y' is as represented by the following FORMULA 6.

$$Y'=2^{\wedge}(-2)-1*2^{\wedge}(-4)-1*2^{\wedge}(-5)-1*2^{\wedge}(-6)-1*2^{\wedge}(-7)-$$
$$1*2^{\wedge}(-8)-1*2^{\wedge}(-11)-1*2^{\wedge}(-13)-1*2^{\wedge}(-14)-1*2^{\wedge}$$
$$(-15)-1*2^{\wedge}(-15)$$ [FORMULA 6]

Further, the terms having the same multipliers in FORMULA 6 are put together as represented by the following FORMULA 7.

$$Y' = 2^{\wedge}(-2) - 1*2^{\wedge}(-4) - 1*2^{\wedge}(-5) - 1*2^{\wedge}(-6)$$ [FORMULA 7]
$$-1*2^{\wedge}(-7) - 1*2^{\wedge}(-8) - 1*2^{\wedge}(-11)$$
$$-1*2^{\wedge}(-13) - 1*2^{\wedge}(-14) - 1*2^{\wedge}(-15)$$
$$-1*2^{\wedge}(-15)$$
$$= 2^{\wedge}(-2) - 1*2^{\wedge}(-4) - 1*2^{\wedge}(-5) - 1*2^{\wedge}(-6)$$
$$-1*2^{\wedge}(-7) - 1*2^{\wedge}(-8)$$
$$-1*2^{\wedge}(-11) - 1*2^{\wedge}(-13) - 1*2^{\wedge}(-14)$$
$$-1*2^{\wedge}(-14)$$
$$= 2^{\wedge}(-2) - 1*2^{\wedge}(-4) - 1*2^{\wedge}(-5) - 1*2^{\wedge}(-6)$$
$$-1*2^{\wedge}(-7) - 1*2^{\wedge}(-8)$$
$$-1*2^{\wedge}(-11) - 1*2^{\wedge}(-13) - 1*2^{\wedge}(-13)$$

-continued $$= 2^{\wedge}(-2) - 1*2^{\wedge}(-4) - 1*2^{\wedge}(-5) - 1*2^{\wedge}(-6)$$
$$- 1*2^{\wedge}(-7) - 1*2^{\wedge}(-8)$$
$$- 1*2^{\wedge}(-11) - 1*2^{\wedge}(-12)$$

As represented in FORMULA 7, it is also possible to set number of the bit-shift circuits to be "8" (here, the number of bits to be shifted by the eighth bit-shift circuit is 12 bits).

By the above steps, the number of the bit-shift circuits is minimized. Hence, without enlarging the circuit size, the approximating computation of floating-point numbers with a simplified configuration is possible.

According to the above described embodiment, even when the motor control device performs correction of the rotation angle of the motor, the deterioration of the throughput of the control process is avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A motor control device comprising:
a first determining unit which determines a detected rotation angle and a detected angular speed of a motor according to a signal indicating a rotation position of the motor;
a correcting unit which determines a corrected rotation angle after a predetermined time from a detection time of the detected rotation angle, according to the detected rotation angle and the detected angular speed;
a second determining unit which determines first sine and first cosine corresponding to the detected rotation angle and determines second sine and second cosine corresponding to the corrected rotation angle;
a processing unit which performs a first conversion process for converting three-phase alternate currents of the motor into two-phase direct currents according to the first sine and the first cosine, a control process for determining two-phase direct voltages for generating a target torque from the two-phase direct currents according to the detected angular speed, and a second conversion process for converting the two-phase direct voltages into the three-phase alternate voltages according to the second sine and the second cosine; and
a generating unit which generates three-phase alternate voltage signals for the motor, wherein
the predetermined time includes a processing time of the first conversion process and the control process,
the correcting unit includes
N number of bit-shift circuits, N being a positive integer equal to or more than 2, configured to divide the detected angular speed by powers of 2, and
a calculation circuit configured to determine a rotation angle during the predetermined time according to outputs of the N number of bit-shift circuits and determine the corrected rotation angle according to the rotation angle during the predetermined time and the detected rotation angle.

2. The motor control device according to claim 1, wherein the rotation angle during the predetermined time corresponds to a change amount of the rotation position in a processing time of the first conversion process and the control process.

3. The motor control device according to claim 1, wherein the first bit-shift circuit outputs a first output value, the first output value is equal to or more than the rotation angle during the predetermined time and the most approximate to the rotation angle during the predetermined time,
the second bit-shift circuit outputs a second output value, the second output value is equal to or less than a second difference between the first output value and the rotation angle during the predetermined time and the most approximate to the second difference, and
the nth, n being from 3 to N, bit-shift circuit outputs an nth output value, the nth output value is equal to or less than an nth difference between the first output value, and the rotation angle during the predetermined time plus an additional value of the second to (N-1)th output value, and the most approximate to the nth difference.

4. The motor control device according to claim 1, wherein the correcting unit determines the corrected rotation angle, while the processing unit performs the first conversion process and the control process.

5. The motor control device according to claim 1, wherein the correcting unit determines the corrected rotation angle and the second determining unit determines the second sine and second cosine, while the processing unit performs the first conversion process and the control process.

6. A non-transitory computer readable medium storing a program, the program causing a computer to execute a process comprising:
determining a detected rotation angle and a detected angular speed of a motor according to a signal indicating a rotation position of the motor;
determining a corrected rotation angle after a predetermined time from a detection time of the detected rotation angle, according to the detected rotation angle and the detected angular speed;
determining first sine and first cosine corresponding to the detected rotation angle and determining second sine and second cosine corresponding to the corrected rotation angle;
performing a first conversion process for converting three-phase alternate currents of the motor into two-phase direct currents according to the first sine and the first cosine, a control process for determining two-phase direct voltages for generating a target torque from the two-phase direct currents according to the detected angular speed, and a second conversion process for converting the two-phase direct voltages into the three-phase alternate voltages according to the second sine and the second cosine; wherein
the predetermined time includes a processing time of the first conversion process and the control process, and
the determining of the corrected rotation angle includes
a first to Nth dividing the detected angular speed by powers of 2, N being a positive integer equal to or more than 2,
determining a rotation angle during the predetermined time according to outputs of the first to Nth dividing, and determining the corrected rotation angle according to the rotation angle during the predetermined time and the detected rotation angle.

7. A method executed by a computer, comprising:

determining a detected rotation angle and a detected angular speed of a motor according to a signal indicating a rotation position of the motor;

determining a corrected rotation angle after a predetermined time from a detection time of the detected rotation angle, according to the detected rotation angle and the detected angular speed;

determining first sine and first cosine corresponding to the detected rotation angle and determining second sine and second cosine corresponding to the corrected rotation angle;

performing a first conversion process for converting three-phase alternate currents of the motor into two-phase direct currents according to the first sine and the first cosine, a control process for determining two-phase direct voltages for generating a target torque from the two-phase direct currents according to the detected angular speed, and a second conversion process for converting the two-phase direct voltages into the three-phase alternate voltages according to the second sine and the second cosine; wherein the predetermined time includes a processing time of the first conversion process and the control process, and the determining of the corrected rotation angle includes a first to Nth dividing the detected angular speed by powers of 2, N being a positive integer equal to or more than 2, determining a rotation angle during the predetermined time according to outputs of the first to Nth dividing, and determining the corrected rotation angle according to the rotation angle during the predetermined time and the detected rotation angle.

\* \* \* \* \*